United States Patent [19]
McLain

[11] 3,817,166
[45] June 18, 1974

[54] COOKING AND SMOKING OVEN DEVICE

[76] Inventor: Larry D. McLain, Box 524, Larimore, N. Dak. 58251

[22] Filed: Apr. 25, 1972

[21] Appl. No.: 247,377

[52] U.S. Cl. .................................. 99/480, 99/482
[51] Int. Cl. ............................................ A23b 3/04
[58] Field of Search ............ 99/480, 481, 482, 474, 99/476, 479

[56] References Cited
UNITED STATES PATENTS

| | | | |
|---|---|---|---|
| 1,328,183 | 1/1920 | Mlekush | 99/480 |
| 1,964,372 | 6/1934 | Tygart | 99/482 |
| 2,645,993 | 7/1953 | Voss | 99/480 |
| 2,842,043 | 7/1958 | Reuland | 99/482 |

*Primary Examiner*—Robert W. Jenkins
*Attorney, Agent, or Firm*—Robert E. Kleve

[57] ABSTRACT

The invention comprises a cooking and smoking oven device. The oven device has an electric heating element to cook the meat and char a wood material to create smoke in the oven during the cooking for smoking the meat. The oven device also has a grease pan above the wood material to catch grease drippings from the meat being cooked and to prevent the grease from dripping on the wood product. The grease pan is removable for cleaning. The oven device also has a smoke vent which is operable to be closed after the cooking is completed to retain the smoke in the oven while the meat is cooling.

1 Claim, 5 Drawing Figures

PATENTED JUN 18 1974 3,817,166
FIG.1.
FIG.2.
FIG.3.
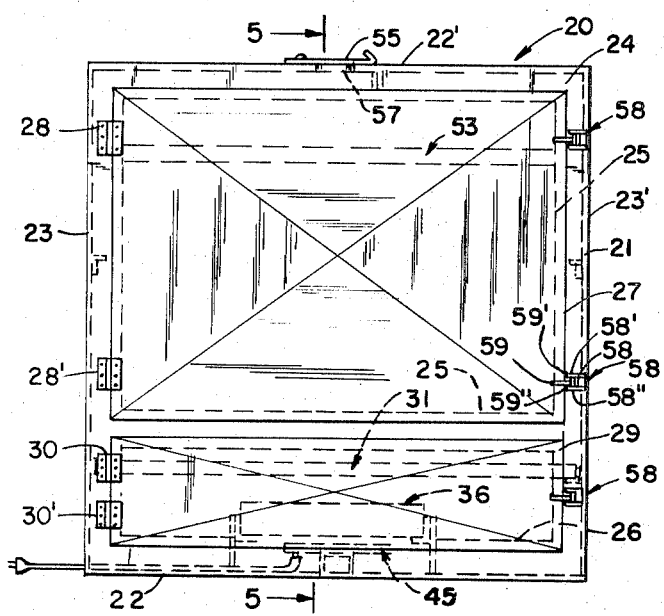
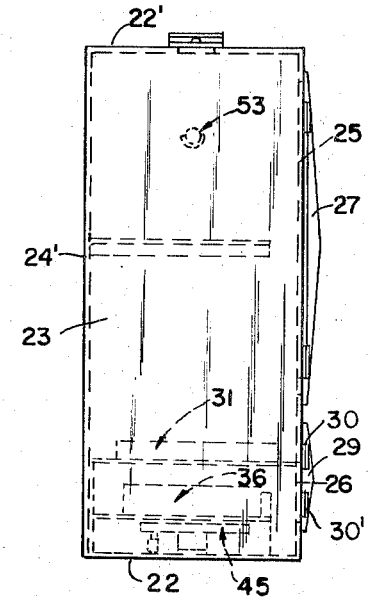
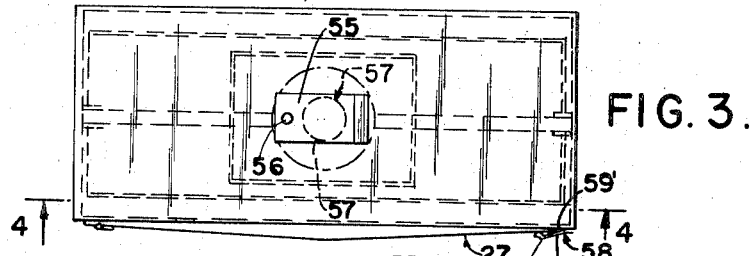
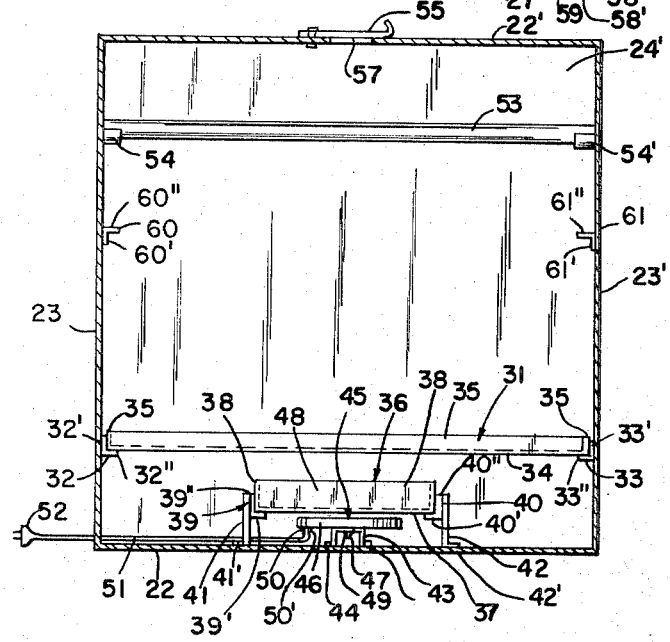
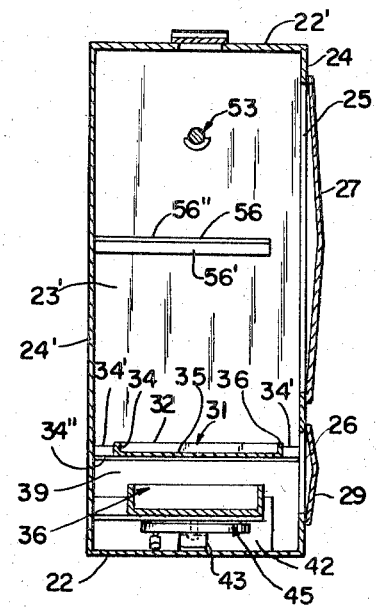
FIG.4.
FIG.5.

COOKING AND SMOKING OVEN DEVICE

This invention relates to ovens more particularly, the invention relates to smoke houses or smoke ovens.

It is an object of the invention to provide a novel smoking oven device which can be easily and efficiently operated to cook and smoke meats.

It is another object of the invention to provide a novel electrically heated cooking and smoking oven which can cook and smoke meats, such as hams, and which has an electric heating element which cooks the meat and which applies heat to saw dust to char the saw dust to coat smoke for smoking the meat.

It is another object of the invention to provide a novel smoking oven device which has an electric heating element to cook the meat which chars a wood material to create smoke to smoke the meat, and which has a removable grease or drip pan which prements grease from dripping in the wood material, and a smoke vent which is operable to close and release the smoke in the oven during the cooling of the meat after the cooking operation is over.

It is another object of the invention to provide a novel cooking and smoking oven which can be easily operated electrically, and which can be manufactured with a minimum of expense and easily transported from place to place.

Further objects and advantages of the invention will become apparent as the description proceeds and when taken in conjunction with the accompanying drawing wherein:

FIG. 1 is a front elevational view of the electric cooking and smoking oven inention.

FIG. 2 is a side elevational view of the electric cooking and smoking oven.

FIG. 3 is a top plan view of the electric cooking and smoking oven.

FIG. 4 is a front cut away view of the electric cooking and smoking oven ivention taken along line 4—4 of FIG. 3.

FIG. 5 is a side cut away view of the electric cooking and smoking oven invention taken along line 5—5 of FIG. 1.

Briefly stated, the invention comprises an electric cooking and smoking device having a housing, a pole is detachably mounted in the oven for suspending meat thereon for cooking and smoking meat, a detachable grease pan is mounted below the pole for catching grease dripping from the meat being cooked and smoked, a detachable tray is mounted beneath the grease pan tray for receiving saw dust. An electric heating element is mounted beneath the lower tray to heat the oven to cook the meat and to char the saw dust to provide smoke to smoke the meat, smoke vent means are provided in the top of the housing with a closure to close the vent.

Referring more particularly to the drawing in FIG. 1 the electric cooking and smoking oven invention 20 is illustrated as having a rectangular box-like housing 21. The housing 21 has top and bottom panels 22 and 22', and side panels 23 and 23' and a front and rear panel 24 and 24'. The front panel 24 has an upper relatively large rectangular opening 25 and a lower relatively small rectangular opening 26. A large rectangular sheet metal door 27 is pivotally mounted on hinges 28 and 28' to the front panel 24 to provide a closure for the opening 25. A smaller rectangular door 29 is pivotally mounted hinges 30 and 30' to the front panel 24 to provide a closure for opening 26.

A rectangular elongated grease pan tray 31 rests upon a pair of L-shaped sheet metal supports 32 and 33. The L-shaped supports have their vertical flange 32' and 33' riveted flush with the walls 23 and 23', respectively, and their horizontal flanges 32" and 33", respectively, projecting horizontally toward one another with the grease pan tray 31 resting upon the horizontal flanges 32" and 33" of the sheet metal supports 32 and 33. The tray 31 is formed of sheet metal having a solid bottom panel 34 and four side walls 35.

Beneath the grease pan tray 31 is a sheet metal tray 36 for holding hichory wood saw dust. The saw dust tray 36 has a sheet metal bottom 37 and four side walls 38. The saw dust tray 36 is smaller in width and length than the grease pan or tray 31 and is positioned centrally beneath the grease pan 34. The saw dust tray rests upon the horizontal flanges 39' and 40' of the L-shaped sheet metal supports 39 and 40. The sheet metal supports 39 and 40 have their other flanges 39" and 40" fixed to the vertical sheet metal wall members 41 and 42. The sheet metal wall members 41 and 42 have horizontal flanges 41' and 42' at their lower ends which are riveted to the bottom panel 22 of the housing 21 of the oven device 20.

An inverted U-shaped metal bracket 43 is riveted to the bottom panel 22. A conventional heating element 45 has a ceramic disc-like housing 46 with a heating coil therein arranged in circular concentric grooves in the ceramic disc-like housing 46. A bolt 47 passes through the center bore in the disc-like housing 46 and through a bore in the apex of the bracket 43 and a nut 49 is threaded onto the bolt to lock the heating element 45 to the bracket 43. The bolt 47 has an enlarged head which is larger than the bore in the ceramic housing to hold the housing in the bracket. The heating coil has its outer ends 50 and 50' connected electrically to an electric cord 51, and the cord 51 passes through a bore in the wall member 41 through a bore in the wall of the side panel 23 to the outside of the housing 21, with an electric plug 52 electrically mounted to the wires of the outer end of the cord, whereby pluging the plug 52 into a source of electric current will energize the heating coil in the heating element 45.

An elongated wooden cylindrical pole 53 is detachably mounted in the oven. A pair of half sleeves 54 and 54' are fixed to side walls 23 and 23', respectively and the pole 53 rests in the half sleeves 54 and 54'. The meat for cooking and smoking will be suspended from the pole 53.

A pair of L-shaped supporting brackets 60 and 61 are mounted to the side walls 23 and 23', respectively and spaced below the pole 53. The supporting brackets 60 and 61 have their vertical flange 60' and 61' riveted flush with the walls 23 and 23' with their horizontal flanges 60" and 61" projecting horizontally inward toward one another and providing a support for placing a grill thereon, so that meat may be placed upon the grill for cooking and smoking.

A smoke vent is provided in the top panel 22 of the housing. The smoke vent 54 has a flange 55 which is pivotally mounted to top panel 22 by a pin or rivet 56, to pivot over the smoke vent bore 57 in the top panel to close the vent or hole 57 in the housing.

The oven doors 27 and 29 are each provided with conventional spring locks 58. The spring lock 58 each has a spring metal U-shaped plate 58 which is mounted to the front panel 24 by rivets. The legs 58' and 58" of the plate 58 hold the legs 59' and 59" of the T-shaped end of the elongated locking member 59 in either their closed position, as shown in solid lines in FIGS. 1 and 3, or in their open position which is approximately near 180° counterclockwise from their position shown in FIG. 3. When the locking member 59 is in its closed position as shown in solid lines in FIGS. 1 and 3 they hold the oven doors 27 and 29 closed. When they are pivoted to their open position they allow the oven doors 27 and 29 to swing open.

OPERATION

The meat to be cooked and smoked will be first injected with water and salted. Thereafter the meat will be either suspended from the pole 53, or placed upon a grill and the grill placed upon brackets 60 and 61.

The operation will then fill the tray 36 with hickory saw dust and energize the electric heating element 45 by plugging in plug 52 into a source of electric current. The operator will then open the smoke vent by pivoting the flange 55 about the pin 56 in either a counterclockwise or clockwise direction when viewed from FIG. 3, which opened the hole or bore 57 in the top panel 22 of the housing 21 of the oven. He will also close the oven doors 27 and 29 and pivot the arms 59 counterclockwise to their position shown in FIGS. 1 and 3 to lock the doors closed. When the doors 27 and 29 are locked closed, the oven will be substantially air tight except for the hole 57 in the top panel.

The heating element 45 will be energized for approximately 12 hours with the smoke vent hole 57 open and the oven door closed. The electric heating element 45 will be preset to provide a constant low heat sufficient to properly cook the meat in 12 hours. The heat from the heating element 45 will also act to char or burn the hickory saw dust in the tray 36, somewhat in the manner as charcoal, so as to slowly burn the saw dust. The smoke from the charing or burning hickory saw dust will act to smoke the meat being cooked in the oven device 20. The pan tray 31 having a solid bottom prevents grease dripping from the meat during the cooking from dripping on the saw dust in the tray 36 by collecting the grease drippings in the tray 31.

At the end of each hour during the 12 hour cooking period, the operator will open the bottom door 29 and refill the tray 37 with hickory saw dust. Also, during this 12 hour cooking period, the smoke from the saw dust will travel out through the smoke vent 57.

At the end of the 12 hour period the operator will turn off the electric heating element 45 by unplugging the plug 52 from the source of electric current, and he will also close the smoke vent 57 by pivoting the panel or flange 55 back over on top of the vent or bore 57, to its position shown in solid lines in FIGS. 1 and 3.

The operator will then allow the meat to cool for several hours with the smoke vent 57, closed. The meat will continue to absorb smoke in the oven during this cooling period. When the meat has sufficiently cooled, the operator will open the door 27 and remove the meat by detaching it from the pole 53 or removing it from the grill.

The meat after being cooked for approximately 12 hours and allowed to cool, as described, will be very satisfactory for human consumption as a cooked and smoked meat.

The oven device may be employed for cooking and smoking a variety of meats, and will cook and smoke up to sixty pounds of meat. The electric heating element 45 of the oven device provides a constant heat during the cooking period and customarily needs no attention during this period. The total cooking period will vary depending upon the type and weight of the meat.

Thus it will be seen that a novel, inexpensive, cooking and smoking oven device has been provided for electrically cooking and smoking meats, and which can be easily operated with a minimum of attention.

It will be obvious that various changes and departures may be made to the invention without departing from the spirit thereof, and accordingly, it is not intended that the invention be limited to that specifically described in the specification or as illustrated in the drawing but only as set forth in the appended claims wherein:

What is claimed is:

1. A cooking and smoking oven comprising a metal housing, said housing having vertical walls fixed together with a top panel fixed to the top of said side walls to form an enclosure, one of said vertical side walls having an upper and lower opening, an upper and lower door pivotally mounted along one edge of said one side wall adjacent said upper and lower openings, respectively, to open and close against said one side wall to open and close said openings, meat supporting means adjacent said upper opening and detachably mounted within said housing through said upper opening, a saw dust tray adjacent said lower opening and detachably mounted to said side walls through said lower opening for receiving and holding hickory saw dust in said enclosure, a catch tray detachably mounted within said housing through one of said openings and positioned beneath said meat support means and above said saw dust tray for catching grease drippings thereon, an electric heating element mounted beneath said saw dust tray for heating and cooking said meat and for heating and charring said saw dust in said tray to smoke the meat, said housing having an opening adjacent the top thereof serving as a smoke vent, a movable vent cover to close said vent to retain said smoke in said housing for further smoking of the meat after cooking.

* * * * *